US012809844B1

(12) United States Patent
Saha et al.

(10) Patent No.: US 12,809,844 B1
(45) Date of Patent: Nov. 24, 2026

(54) HIERARCHICAL DATA STRUCTURE RENDERING AND INTERACTION SERVICE

(71) Applicant: Oracle International Corporation, Redwood Shores, CA (US)

(72) Inventors: Kakoli Saha, Cupertino, CA (US); Deepak Sharma, Santa Clara, CA (US); Shaun Bakey, San Ramon, CA (US); Prasad Kulkarni, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/329,128

(22) Filed: Sep. 15, 2025

(51) Int. Cl.
*G06F 16/20* (2019.01)
*G06F 16/21* (2019.01)
*G06F 16/22* (2019.01)

(52) U.S. Cl.
CPC ........ *G06F 16/2246* (2019.01); *G06F 16/219* (2019.01)

(58) Field of Classification Search
CPC .......................... G06F 16/2246; G06F 16/219
See application file for complete search history.

(56) References Cited

U.S. PATENT DOCUMENTS 8,249,885 B2 * 8/2012 Berkowitz ......... G06Q 30/0625 705/1.1
8,266,531 B2 * 9/2012 Jolley ................... G06F 16/954 715/742
2005/0243020 A1 * 11/2005 Steeb ........................ G06F 3/14 345/1.3
2006/0069617 A1 * 3/2006 Milener ............... G06Q 20/145 705/14.69
2006/0074984 A1 * 4/2006 Milener ................ G06F 16/957 707/E17.112
2013/0227112 A1 * 8/2013 Lehmann ............ G06F 16/9574 709/224

(Continued)

OTHER PUBLICATIONS

Brocard, L., "ETags: What they are, and how to use them", https://www.fastly.com/blog/etags-what-they-are-and-how-to-use-them, Jul. 28, 2025.

(Continued)

*Primary Examiner* — Mahesh H Dwivedi
(74) *Attorney, Agent, or Firm* — Invoke

(57) ABSTRACT

A service is provided for rendering and interacting with hierarchical data tree(s). The service stores, in a cache, valid version(s) of first data associated with first identifier(s) of first entities of node tree(s). The service accesses request(s) for a plurality of entities for display on navigable tree(s). In response to the request(s), the service determines that the valid version(s) of first data are in the cache and that valid version(s) or second or third data are not in the cache. The service accesses the cache to retrieve the valid version(s) of first data and accesses node tree source(s) to retrieve valid version(s) of second data. The service causes display of graphical user interface(s) showing data for at least part of the plurality of entities, and the graphical user interface(s) include the navigable tree(s) that allow navigation to one or more of the plurality of entities. The service displays data for the plurality of entities in parallel while second or third data for other entities are being retrieved from the node source tree(s).

20 Claims, 9 Drawing Sheets

(56) References Cited

U.S. PATENT DOCUMENTS

| | | | | |
|---|---|---|---|---|
| 2016/0043999 A1* | 2/2016 | Wongkar | ............ | H04L 67/5682<br>726/12 |
| 2019/0286458 A1* | 9/2019 | Koryakin | ................ | G06F 3/048 |

OTHER PUBLICATIONS

Geeks for Geeks, "What is HTTP ETag?", https://www.geeksforgeeks.org/computer-networks/what-is-http-etag/, Jul. 12, 2025.

* cited by examiner

HIERARCHICAL DATA STRUCTURE RENDERING AND INTERACTION SERVICE

BACKGROUND

Computing systems rely on structured methods for storing and retrieving information. Large and complex data sets require models that reflect logical relationships but are still accessed with ease. Among the many ways of organizing information, hierarchical arrangements stand out for their ability to reflect real-world dependencies and nested groupings. These arrangements provide a foundation for understanding how data can be managed, queried, and maintained at scale.

Data trees are an example of a hierarchical data structure and are a way of organizing information where each node may have one or more child nodes, forming a hierarchy. Data trees may be used to represent relationships in computing such as file systems, organizational charts, XML or JSON documents, knowledge graphs and/or other similar computer-based architectures. Data trees capture parent-child relationships and enable traversal patterns that reflect real-world hierarchies. Whether stored in a database, a file system, or in memory, data trees allow organization and retrieval of nested information.

Despite these advantages, working with data trees can be complex and cumbersome. As trees grow in depth and breadth, keeping track of relationships between nodes becomes challenging. Navigating a large data tree may require traversing multiple levels before reaching relevant data, and subtle differences between nodes can make requesting the correct data difficult. In large-scale enterprise systems, these issues are compounded by the need to synchronize updates across branches of the data tree. Potential errors and inefficiencies arise which may be costly to a company employing such a system.

One way to address these challenges is using improved metadata. Metadata may include descriptive information about nodes such as labels, timestamps, and relationships. Data trees may become more manageable and easier to work with through the addition of quality metadata because metadata can act as a guide for anyone unfamiliar with a particular data tree. Through thoughtful inclusion of metadata for nodes in a data tree, querying and traversing the data tree may be accomplished by human and automated systems in an efficient manner.

However, implementing rich and intricate metadata involves additional costs and trade-offs. Defining, storing, and maintaining metadata requires developer time and persistence. Extra storage space and processing overhead are also concerns. Further, large organizations or companies progressing through mergers may see mounting inconsistencies that may derail the entire organization system. As a result, while metadata can greatly reduce the difficulty of working with complex data structures, other tools may be required to alleviate significant problems navigating hierarchical data trees.

BRIEF SUMMARY

In some embodiments, a computer-implemented method includes a service for rendering and interacting with hierarchical data tree(s). The service stores, in a cache, valid version(s) of first data associated with first identifier(s) of first entities of node tree(s). The service accesses request(s) for a plurality of entities for display on navigable tree(s). In response to the request(s), the service determines that the valid version(s) of first data are in the cache and that valid version(s) or second or third data are not in the cache. The service accesses the cache to retrieve the valid version(s) of first data and accesses node tree source(s) to retrieve valid version(s) of second data. The service causes display of graphical user interface(s) showing data for at least part of the plurality of entities, and the graphical user interface(s) include the navigable tree(s) that allow navigation to one or more of the plurality of entities. The service displays data for the plurality of entities in parallel while second or third data for other entities are being retrieved from the node source tree(s).

In a particular embodiment, a computer-implemented method includes storing, in a cache, a valid version of first data associated with a first identifier of one or more first entities of one or more node trees, without storing, in the cache, a valid version of second data associated with a second identifier of one or more second entities of the one or more node trees, and without storing, in the cache, a valid version of third data associated with a third identifier of one or more third entities of the one or more node trees. The valid version of first data is stored, in the cache, in response to a first retrieval of the valid version of the first data from a node tree source. The computer-implemented method further includes accessing a request for a plurality of entities for display on a navigable tree. The plurality of entities includes the one or more first entities identified by the first identifier and the one or more second entities identified by the second identifier. The plurality of entities does not include the one or more third entities. The computer-implemented method further includes, in response to the request, determining, based at least in part on the first identifier and the second identifier, that the valid version of first data is in the cache and that the valid version of second data is not in the cache. Then, in response to the determining, accessing the cache to retrieve the valid version of first data and accessing the node tree source to retrieve the valid version of second data without retrieving at least part of the valid version of third data. The computer-implemented method further includes causing display of a graphical user interface showing data for at least part of the plurality of entities. The graphical user interface includes the navigable tree that allows navigation to the one or more first entities and the one or more second entities. Data for at least one of the one or more first entities is displayed on the navigable tree in parallel while data for at least one of the one or more second entities is retrieved from the node tree source. The data for the at least one of the one or more second entities is added to the navigable tree after receiving a response from the node tree source. The computer-implemented method further includes determining that the one or more third entities are accessible from the navigable tree even though the one or more third entities were not among the plurality of entities of the request, and, in response to the determining that the one or more third entities are accessible from the navigable tree and that the cache does not store the valid version of third data, retrieving the valid version of third data from the node tree source absent a separate request to view data for the one or more third entities.

In a further embodiment, the first retrieval of the valid version of first data from the node tree source is performed in response to determining that the cache stores an invalid version of first data based at least in part on determining a change associated with the first identifier without receiving a new request to view the one or more first entities on the graphical user interface since the invalid version of first data was retrieved.

In the same or a different further embodiment, the computer-implemented method further includes receiving another request to display data for at least one of the one or more third entities, and determining a status of an incomplete retrieval of the valid version of third data from the node tree source. Then, based at least in part on the status, awaiting completion of the incomplete retrieval of the valid version of third data from the node tree source without initiating a separate retrieval of the valid version of third data from the node tree source.

In another embodiment that extends the particular embodiment or any further embodiment, the computer-implemented method further includes receiving another request to display data for at least one of the one or more third entities and determining a status of an incomplete retrieval of the valid version of third data from the node tree source. Then, based at least in part on the status, requesting the valid version of third data from the node tree source in a separate request in parallel with a prior request for the valid version of third data from the node tree source.

In another embodiment that extends the particular embodiment or any further embodiment, the computer-implemented method further includes receiving another request to display data for at least one of the one or more third entities and requesting the valid version of third data from the node tree source in a separate request in parallel with a prior request for the valid version of third data from the node tree source. Then, canceling the separate request for the valid version of third data from the node tree source on determining that the prior request is completed.

In another embodiment that extends the particular embodiment or any further embodiment, the computer-implemented method further includes receiving another request to display data for at least one of the one or more third entities and requesting the valid version of third data from the node tree source in a separate request in parallel with a prior request for the valid version of third data from the node tree source. Then, canceling the prior request for the valid version of third data from the node tree source on determining that the separate request is completed.

In another embodiment that extends the particular embodiment or any further embodiment, the computer-implemented method further includes a method wherein the cache is maintained in a browser cache and the node tree source is a server remote to the browser. Data for the one or more node trees is delivered from the node tree source to the browser via size-limited packets that are smaller in size than the first data, smaller in size than the second data, and smaller in size than the third data.

In another embodiment that extends the particular embodiment or any further embodiment, the computer-implemented method further includes a method wherein the cache is maintained in a browser with storage limitations that prevent storage of the one or more node trees in their entirety.

In another embodiment that extends the particular embodiment or any further embodiment, the computer-implemented method further includes a method wherein the cache is maintained in a browser cache with storage limitations specific to different URLs; wherein at least the valid version of third data from the node tree source is retrieved from a separate URL than at least the valid version of first data from the node tree source.

In another embodiment that extends the particular embodiment or any further embodiment, the computer-implemented method further includes a method wherein receiving a response from the node tree source includes receiving the valid version of second data as streaming JSON.

In another embodiment that extends the particular embodiment or any further embodiment, the computer-implemented method further includes a method wherein the response from the node tree source utilizes at least one of text compression, binary encodings, or schema-based compression techniques.

In another embodiment that extends the particular embodiment or any further embodiment, the computer-implemented method further includes a method wherein the request is generated based on learned user interaction with the navigable tree. The learned user interaction indicates the one or more second entities are more likely to be retrieved with the one or more first entities than the one or more third entities are to be retrieved with the one or more first entities.

In another embodiment that extends the particular embodiment or any further embodiment, the computer-implemented method further includes a method wherein at least one of retrieval or display of at least one of the first data, the second data, or the third data is altered based at least in part on one or more authentication parameter.

In another embodiment that extends the particular embodiment or any further embodiment, the computer-implemented method further includes a method wherein the request is generated based at least in part on a location of entities within the navigable tree, and wherein the one or more second entities share a neighborhood with the one or more first entities.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory and/or transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items or separate process instances of a set of process instances. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1:
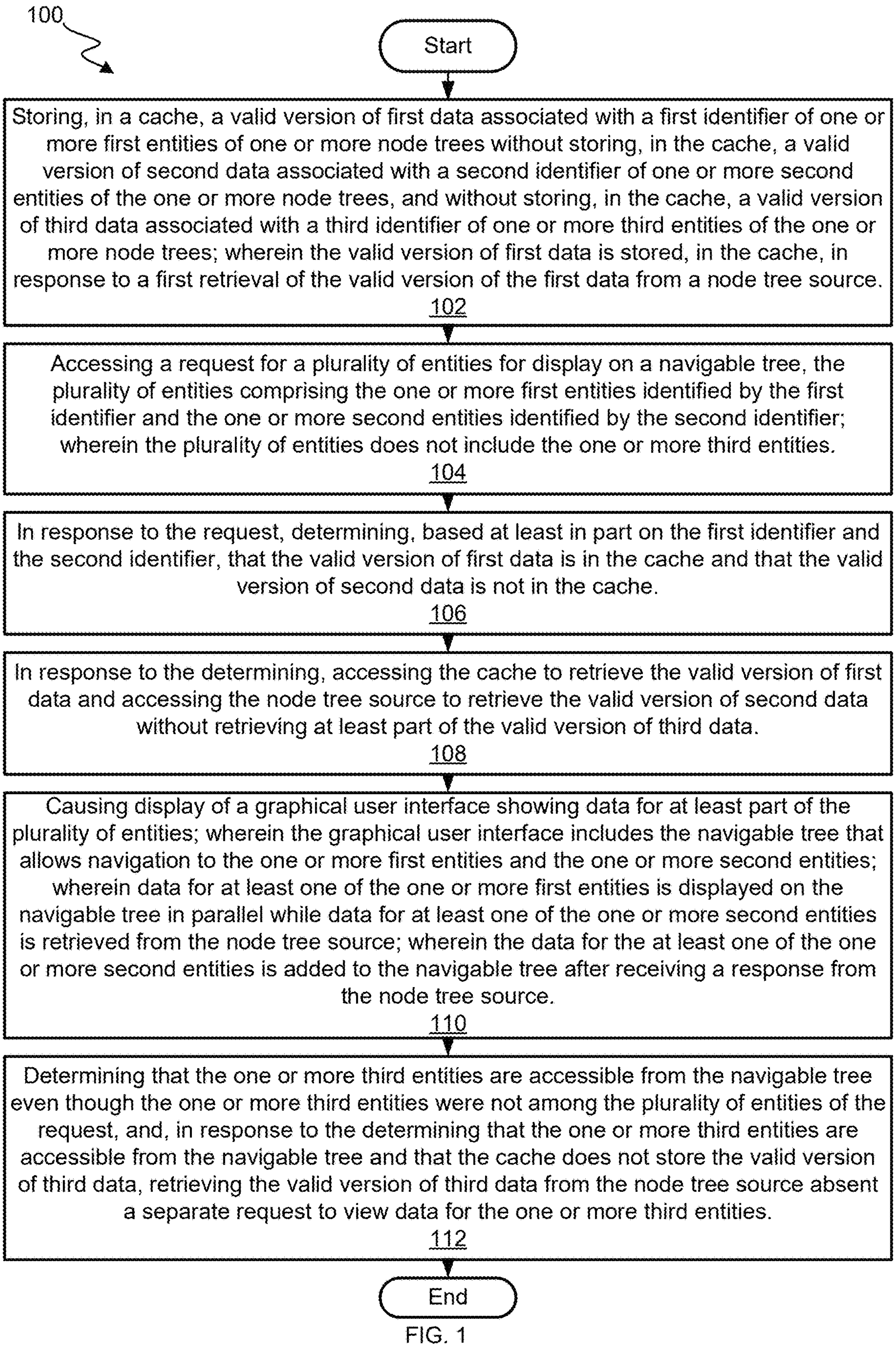
FIG. 1 illustrates a flow chart of an example process that renders and interacts with a hierarchical tree.

A service is provided for rendering and interacting with hierarchical data tree(s). The service stores, in a cache, valid version(s) of first data associated with first identifier(s) of first entities of node tree(s). The service accesses request(s) for a plurality of entities for display on navigable tree(s). In response to the request(s), the service determines that the valid version(s) of first data are in the cache and that valid version(s) or second or third data are not in the cache. The service accesses the cache to retrieve the valid version(s) of first data and accesses node tree source(s) to retrieve valid version(s) of second data. The service causes display of graphical user interface(s) showing data for at least part of the plurality of entities, and the graphical user interface(s) include the navigable tree(s) that allow navigation to one or more of the plurality of entities. The service displays data for the plurality of entities in parallel while second or third data for other entities are being retrieved from the node source tree(s).

In various embodiments, the hierarchical data tree rendering and interaction service is implemented using non-transitory and/or transitory computer-readable storage media to store instructions which, when executed by one or more processors of a computer system, cause display of the user interface and processing of received input to render a navigable tree with valid versions of data. The hierarchical data tree rendering and interaction service may be implemented on a local or cloud-based computer system that includes processors and a display for showing the user interface for viewing and interacting with a navigable tree. The computer system may communicate with client computer systems for rendering and displaying a navigable tree for viewing and interaction.

A description of the hierarchical data tree rendering and interaction service is provided in the following sections:

PROCESSING REQUESTS THROUGH RETRIEVAL OF VALID DATA FROM NODE TREE SOURCES
CACHING WITH ETAG
ORCHESTRATED REQUEST FULFILMENT THROUGH PARALLEL LOADING AND CACHE VERIFICATION.
DYNAMIC RENDERING OF HIERARCHICAL DATA IN A GRAPHICAL USER INTERFACE
CONFIGURATION OF ACCESS AND RENDERING TO USER-SPECIFIC OR ROLE-SPECIFIC DATA
AGENTIC REQUEST GENERATION AND DISPLAY OF DATA
COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Processing Requests Through Retrieval of Valid Data from Node Tree Sources

Data trees stored on a server may be accessed by client devices through download operations. Data trees are hierarchical and may contain many nodes across multiple levels. Download strategies may account for both the size of a tree and the access patterns of a requesting application. In some scenarios, an entire data tree may be requested in a bulk transfer, ensuring that the client has a complete local copy of all nodes and relationships. Once a complete local copy is obtained, navigating between nodes may be accomplished in a near instantaneous fashion. Bulk transfer may be preferred by requesters with high bandwidth but poor latency because an entire data tree may be downloaded quickly.

In one embodiment, streaming JSON may be used as a technique for processing a bulk download of data from a tree source such as a server. When using streaming JSON, the server may transmit the hierarchical structure incrementally as a continuous stream rather than as a single JSON structure. Each row of a data tree may be sent as a separate fully enclosed valid line of JSON. Parsing and processing portions of the data tree may occur on arrival and may also allow for recovery in case of interruption. For example, a desktop or mobile application may support bulk download through streaming JSON where each downloaded row may be placed in a local database prior to any interruption. Upon reconnection, the previous request may be fulfilled by starting at the next missing row rather than from the beginning. Additionally, each row may also be stored with an ID so after a reconnection the previous request may be fulfilled by starting after a particular ID.

In one embodiment, bulk data may be downloaded with streaming JSON and assigned an ID but become out of date or invalid based on changes to a data tree on the server side. In that or similar situations, the server may calculate the delta between the downloaded data and the updated data tree. The server may then deliver only the data with changes for the client to take and update the database storing the invalid data. The client may delete the old data and replace it, or delete old data without replacement in cases where the changes were only made by removing data from the server-side data tree.

Another way to approach processing requests for data in a data tree may include using a lazy-load technique. When using lazy-load, only portions of the data tree required for an initial task are retrieved. Retrieving data from nodes in a data tree is processed on a request-by-request basis. Additional nodes from subsequent requests are downloaded on demand when accessed. Lazy-load may reduce cost of retrieval when only portions of a data tree are required to fulfil a request. For example, when a search is performed and the request can be filled by partial data already downloaded through lazy-load, there is no need to return to a server. Lazy-load may be preferred by requesters with low latency but poor bandwidth because results may appear quickly while navigating a data tree even if a bulk down would never have finished.

In one embodiment, lazy loading may include pagination and an iterator. For example, the lazy load may be handing a request for a particular amount of data. The amount of data may be spread across numerous entities making performing a lazy-load cumbersome. The lazy load may break the collection of entities into smaller pieces for processing. Then, it may look for the requested data a first small piece before moving onto the next piece. In cases where all the requested data is found in the first small piece, the lazy-load of remaining pieces may be cancelled.

Another strategy may be just-in-time loading, where specific requests trigger targeted retrieval of nodes or subtrees from the server. This method may be implemented through APIs such as REST, GraphQL, gRPC, Cobra, WebSockets, microservices, and/or other similar retrieval technologies. Just-in-time loading may allow clients to specify precise queries for the data they require. Just-in-time loading may limit bandwidth usage by limiting data transfers to what is immediately necessary.

Caching of Valid Data from Node Tree Sources

Once data trees are downloaded from a server, they may be stored temporarily in a cache to reduce redundant network operations such as constantly requesting data from a server. Caching allows repeated access to the same nodes or subtrees without requiring additional downloads, improving both speed and reducing strain on a server. Because hierarchical structures may involve repeated traversal of common branches, caching can significantly reduce latency for end users and lower the overall load placed on a server.

One consideration in caching is ensuring that the data tree remains consistent with a master tree on the server it came from. Servers may provide validation mechanisms that allow the client to confirm whether the cached copy is still current. For example, one mechanism may be the use of ETags (Entity Tags). ETags are identifiers assigned to specific versions of server resources. When a client stores a cached copy of a data tree or subtree, the associated ETag may be saved alongside it.

When processing requests for a plurality of entities for display on a navigable tree a service may submit a stored ETag to the server in a conditional request. If the ETag matches the server's current version, the client may safely use the cached copy without downloading the data again. If the ETag does not match, the server signals that the data has changed, prompting the client to refresh its cache with the updated tree or subtree.

In one embodiment, caching may occur in a browser with a URL. When verifying the validity of data in the cache, the browser may receive a response that an ETag is unmodified and that they cached data is valid. In that case, the browser may retrieve the data from local cache without the client even knowing. Using ETag verification avoids redundant downloads by using cached data trees for fast responses that are still verified as up to date.

Orchestrated Request Fulfilment Through Parallel Loading and Cache Verification

Web applications may work with large amounts of data and may be required to display data trees with nodes on the order of millions and above. Data trees with so many nodes may struggle with immediate node rendering and display. Large trees may also limit the ability of a user to quickly expand and collapse each node. The highest impact may be with wide trees, such as those with all children existing under a parent node, or deep trees such as those with many different levels. Web applications unequipped to handle large data trees may see high delays and slow load times.

Fulfilment

As opposed to accepting delays associated with a single loading method, multiple strategies may be coordinated and used in tandem to reap the benefits of each individual strategy while minimizing disadvantages. An abstraction may be provided which delegates a bulk load to the background while a lazy tree data source uses pagination and an iterator. JSON streaming may also be utilized allowing a server to stream data out of order on a node-by-node basis. Experience may be further improved as a tree may switch data sources mid-stream iteration to a fully loaded bulk data source. Any completed content may be cached in a browser using resource-based URLs and verified with ETAG to avoid unnecessary downloads in the future and reduce server load. Activity within given trees may also be tracked or used to train machine learning algorithms to target areas of large trees for priority loading. The integrated strategies provide an improved experience by delivering near instant response in a user interface while handing large amounts of data in both wide and deep trees.

FIG. 1 illustrates a flow chart of an example process 100 that renders and interacts with a hierarchical tree. Process 100 begins in block 102 by a system storing, in a cache, a valid version of first data associated with a first identifier of one or more first entities or one or more node trees. Storing of the valid versions of data may be in a cache maintained in a browser, local storage, mobile application, desktop application, and/or other similar cache locations. The valid version of the first data is stored in response to a first retrieval of the valid version of the first data from a node tree source. Example node tree sources may include servers, cloud storage, cloud-hosted databases, IoT or edge devices, file systems, and/or other similar storage devices. At this stage in process 100, valid versions of second and third data associated with respective second and third identifiers of one or more respective second and third entities of the one or more node trees are not stored in the cache.

In block 104 of process 100, the system accesses a request for a plurality of entities for display on a navigable tree. The request may come from a user, a graphical user interface, another system, as the result of a prompt to machine learning, from an artificial intelligence agent, and/or other similar requesters. The plurality of entities in block 104 may include the one or more first entities identified by the first identifier as well as the one or more second entities identified by the second identifier. At this stage in process 100, the plurality of entities does not include the one or more third entities.

Process 100 continues with block 106. In block 106, in response to the request for a plurality of entities, the system determines that the valid version of first data is in the cache and that the valid version of second data is not in the cache. The determination is based at least in part on the first identifier and the second identifier. In block 108, in response to determining that the valid version of first data is in the cache and that the valid version of second data is not in the cache, the system accesses the cache to retrieve the valid version of first data. The system also accesses the node tree source to retrieve the valid version of second data. At this stage in process 100, the system proceeds without having retrieved at least part of the valid version of third data.

In block 110, process 100 continues with the system causing display of a graphical user interface showing data for at least part of the plurality of entities. The graphical user interface may include web browsers, desktop applications, mobile applications, tablets and touch devices, embedded systems, remote desktops, virtual and augmented reality devices, smart TVs, wearables, and other similar display devices. The graphical user interface includes the navigable tree that allows navigation to the one or more first entities and the one or more second entities. Data for at least one of the one or more first entities is displayed on the navigable tree in parallel while data for at least one of the one or more second entities is retrieved from the node tree source. Data for the at least one of the one or more second entities is added to the navigable tree after receiving a response from the node tree source.

In block 112 of process 100, the system determines that the one or more third entities are accessible from the navigable tree even though the one or more third entities were not among the plurality of entities of the request. In response to determining that the one or more third entities are accessible from the navigable tree and that the cache does not store the valid version of third data, the system retrieves the valid version of third data from the node tree sources. Such a retrieval occurs absent a separate request to view data for the one or more third entities.

In one embodiment, the first retrieval of the valid version of the first data from the node tree, referenced in block 102 of process 100, is performed in response to determining that the cache stores an invalid version of first data. The determination is based at least in part on determining a change associated with the first identifier without receiving a new request to view the one or more first entities on the graphical user interface since the invalid version of first data was retrieved. For example, the first identifier may be an entity tag (ETag) and the determining that the cache stores an invalid version of first data may include a browser sending a request including an ETag to a server and receiving a response from the server indicating that the included ETag is no longer valid. A valid version of first data may be returned by the server to the cache with a new ETag.

In another or continuing embodiment, the system may receive another request to display data for at least one of the one or more third entities referenced in process 100. The system may determine a status of an incomplete retrieval of the valid version of third data from the node tree source. After making a determination, the system may await completion of the incomplete retrieval of the valid version of third data from the node tree source without initiating a separate retrieval of the valid version of third data from the node tree source. For example, the system may be performing a bulk download of the node tree source which includes the valid version of third data. The system may determine that the bulk download will complete faster than a newly initiated lazy load of the valid version of third data. The system may then wait for the bulk download to complete instead of allocating system resources and occupying resources of the node tree source.

In another or continuing embodiment, the system may receive another request to display data for at least one of the one or more third entities referenced in process 100. The system may determine a status of an incomplete retrieval of the valid version of third data from the node tree source. After making a determination, the system may request the valid version of third data from the node tree source in a separate request in parallel with a prior request for the valid version of third data from the node tree source. For example, the system may be performing a bulk download of the node tree source which includes the valid version of third data. The system may determine that the bulk download will not complete faster than a newly initiated lazy load of the valid version of third data. The system may then request a valid version of third data from the node tree source in parallel with performing a bulk download of the node tree source.

In another or continuing embodiment, the system may receive another request to display data for at least one of the one or more third entities referenced in process 100. The system may request the valid version of third data from the node tree source in a separate request in parallel with a prior request for the valid version of third data from the node tree source. The system may cancel the separate request for the valid version of third data from the node tree source on determining that the prior request is completed. For example, the system may be performing a bulk download of the node tree source which includes the valid version of third data, and it may cancel any lazy loads being performed upon the completion of the bulk download.

In another or continuing embodiment, the system may receive another request to display data for at least one of the one or more third entities referenced in process 100. The system may request the valid version of third data from the node tree source in a separate request in parallel with a prior request for the valid version of third data from the node tree source. The system may cancel the prior request for the valid version of third data from the node tree source on determining that the separate request is completed. For example, the system may be performing a bulk download of the node tree source which includes the valid version of third data, and it may cancel the bulk download upon the completion of a lazy load of the valid version of third data.

Figure 2:
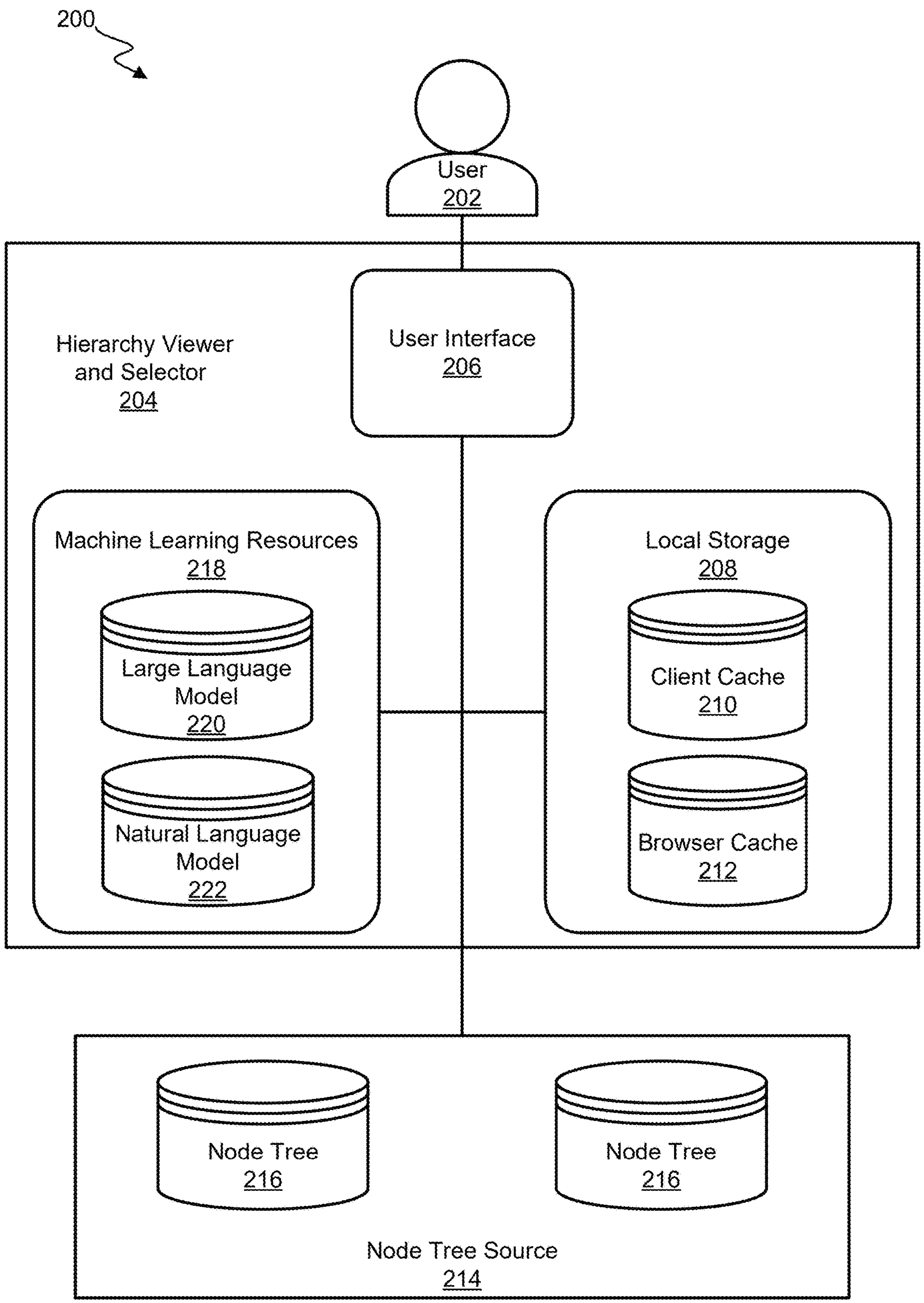
FIG. 2 illustrates a system diagram showing an example infrastructure that renders and interacts with a hierarchical tree.

FIG. 2 illustrates a system diagram showing an example infrastructure 200 that renders and interacts with a hierarchical tree. A user 202 may access a hierarchy viewer and selector 204 through a user interface 206. Inside the hierarchy viewer and selector 204 there is a local storage 208 which may include different caches such as a client cache 210 and a browser cache 212. Local storage 208 may store data from node tree source 214, which may include data from one or more node trees 216.

A different cache may be utilized based at least in part on cache storage limitations or the size of the of one or more node trees 216. In one embodiment, the cache is maintained in a browser cache 212 and the node tree source 214 is a server remote to the browser. The data for the one or more node trees 216 is delivered from the node tree source 214 to the browser via size-limited packets that are smaller in size than the first data, smaller in size than the second data, and smaller in size than the third data. In another or continuing embodiment, the response from the one or more node trees 216 may include valid versions of data, such as the valid version of second data in process 100, as streaming JSON. A different cache may also be utilized based at least in part on a particular storage method. In one embodiment, the cache may be maintained in a browser cache 212 with storage limitations that prevent storage of the one or more node trees 216 in their entirety. In another or continuing embodiment the cache is maintained in browser cache 212 with storage limitations specific to different URLs. At least the valid version of third data from the node tree source 214 is retrieved from a separate URL than at least the valid version of first data from the node tree source 214. Additionally or alternatively, the response from the node tree source 214 may utilize at least one of text compression, binary encodings, schema-based compression techniques, and/or other similar compression techniques.

Dynamic Rendering of Hierarchical Data in a Graphical User Interface

FIGS. 3A-3D illustrate diagrams of an example interface 300 showing different example rendered hierarchical data trees. FIGS. 3A-3D all contain an example header 302 which may include information indicating the purpose of interface 300. For example, header 302 in FIGS. 3A-3D includes the message "Select Members" instructing a user to select a number of members within the rendered hierarchical data tree. Interface 300 also includes a drop-down menu 304 for selecting a particular tree or branch of a tree. For example, in FIG. 3A drop-down menu 304 lists "Entity" but it may be any other title such as "Movement" or "Product" found in FIGS. 3B-3D. Search bar 306 is also included in each of FIGS. 3A-3D and may be used for quick navigation around the hierarchical data trees. Search requests may be fulfilled against in memory data rather than submitting requests to a server.

Interface 300 may include a UI framework that provides capabilities to handle Document Object Model (DOM) readiness prior to rendering. In one implementation, the framework utilizes Oracle JET in combination with a Model-View-ViewModel (MVVM) design pattern, facilitated by Knockout.js, to efficiently manage and update the user interface. Use of two-way binding with Knockout.js ensures that the UI and ViewModel remain synchronized, while declarative bindings simplify interactions with the DOM. Additionally, observables are employed to track data changes and automatically trigger corresponding updates in the UI, thereby maintaining a responsive and consistent experience.

Figure 3A:
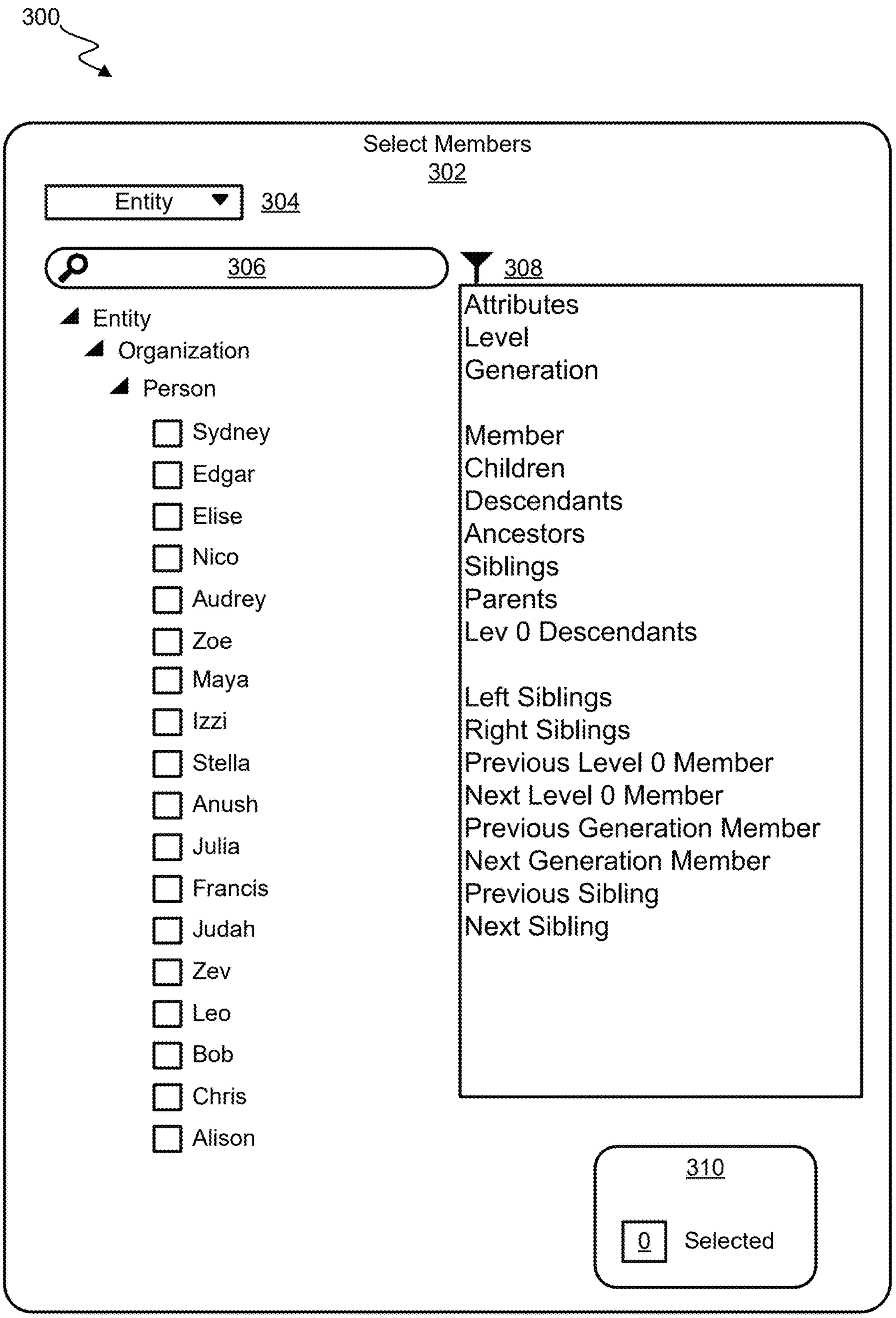
FIG. 3A illustrates a diagram of an example interface showing an example rendered hierarchical data tree.
Figure 3B:
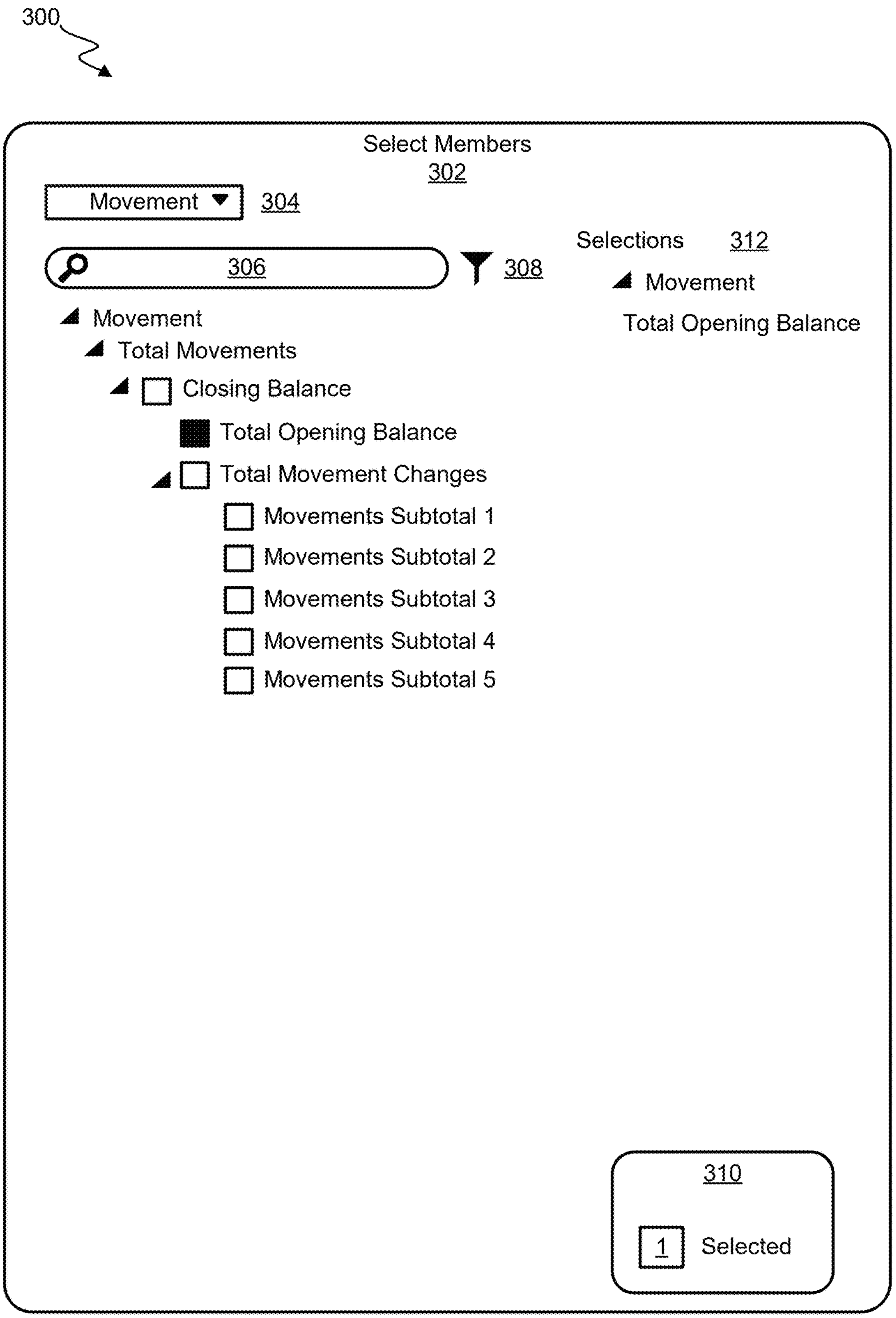
FIG. 3B illustrates a diagram of an example interface showing an example rendered hierarchical data tree.

FIGS. 3A-D also contain filter 308, which is shown in expanded form in FIG. 3A. Filter 308 allows tree navigation and requesting data from the node tree source 214 or local storage 208 depending on whether it is cached and valid. Filter 308 may include selectable options including but not limited to attributes, level, generation, member, children, descendants, ancestors, siblings, parents, level 0 descendants, left siblings, right siblings, previous level 0 member, next level 0 member, previous generation member, next generation member, previous sibling, next sibling, and/or other selectable relationship based navigation items. Each interface may also contain tree requirements such as accessibility, multiple columns, sort, filter, pivot, and/or other similar tree requirements.

In some embodiments, search and other requests may be handled by dynamically creating and modifying a virtual tree. Virtual trees may be created using only certain nodes of a master tree. Virtual trees may also be queried with filtering questions such that otherwise large trees may be focused down to a combination of relevant nodes. A server may generate a virtual tree by sliding up certain nodes and eliminating others. A virtual tree may then be served up for bulk or lazy download to the browser. Filters applied to a virtual tree may be delivered right away after filtering rather than going back to the entire tree at the server. For example, filter 308 may be utilized for selecting desired nodes. Virtual generations may be created and changed dynamically. For example, a master tree may include entries including details about people such as names, hire dates, and salary. The master tree may also include details about company cars such as purchase price. A virtual tree listing people may include hire dates and salary but not a purchase price, but a virtual tree listing company cars may include a person's name as well as the purchase price for a car. Different search functions may be simplified by downloading and querying virtual trees rather than bulk downloading an entire data tree for each set of queries.

Figure 3C:
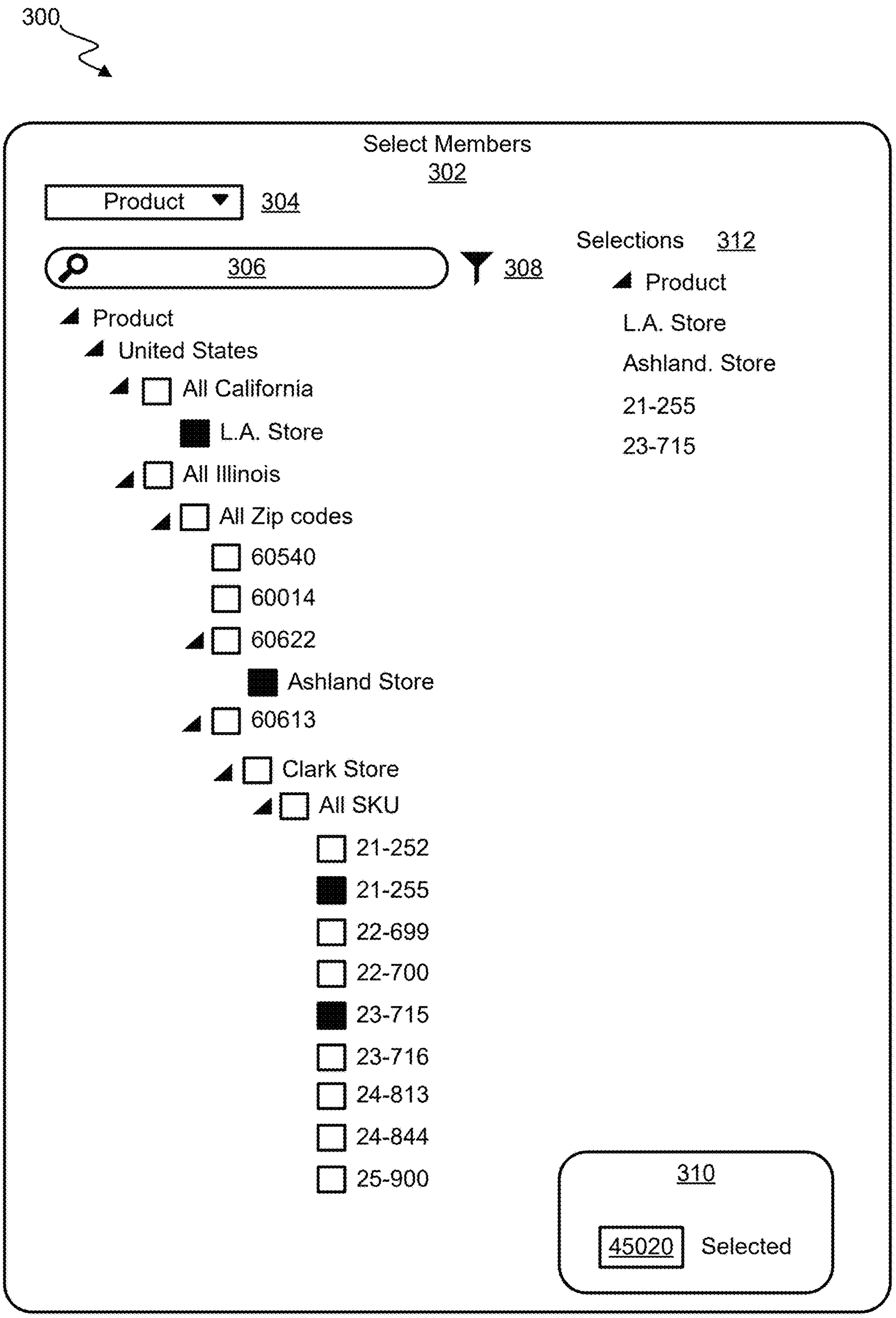
FIG. 3C illustrates a diagram of an example interface showing an example rendered hierarchical data tree.

While each item shown in FIGS. 3A-D are shown in consistent locations, they may also be located in alternate locations throughout interface 300. For example, indicator 310 showing the number of selected members may exist in the bottom right corner of the interface as shown or it may be located toward the top of the interface closer to selections list 312. Selections list 312 keeps a simple formatted list of each selection whether or not the particular branch is expanded for display. For example, in FIG. 3B "Total Opening Balance" is selected in the tree and also appears without the unselected members in selections list 312. In FIG. 3C, multiple selected members appear in selections list 312 even though they are located in different generations.

Figure 3D:
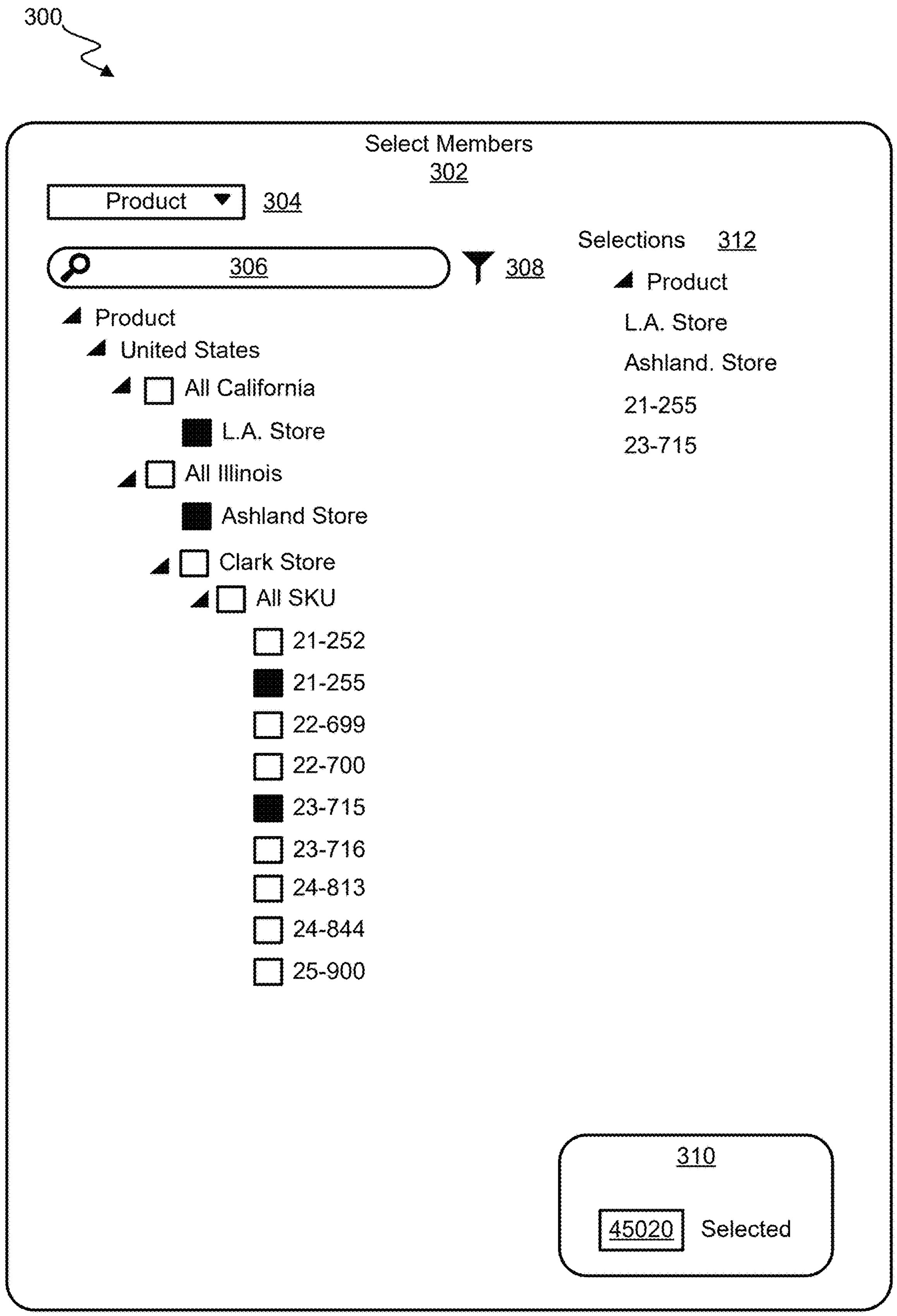
FIG. 3D illustrates a diagram of an example interface showing an example rendered hierarchical data tree.

In FIGS. 3C and 3D, drop-down menu 304 shows that a tree including individual products has been selected. The tree includes countries, states, zip codes, stores, and individual SKUs. For larger enterprises, such a data tree may include member entities on the order of millions. When a data tree includes millions of member entities, hierarchy and viewer selector 204 may make determinations about which member entities to load. For example, a request to load certain member entities may automatically invoke loading related member entities. In one embodiment a generated request may be based at least in part on a location within a navigable tree and one or more second entities that share a neighborhood with one or more first entities may automatically be requested. In FIG. 3C, a request to load "Ashland Store" may automatically include or generate another request to load all SKUs under "Ashland Store" even though that particular section of the tree is not shown in expanded form.

In another embodiment, interface 300 may honor contextual awareness and display only relevant dimensions in a tree. For example, if arriving from a form, a virtual tree may be dynamically created based on context from the form. Similarly, opening a data tree from different places may provide different lists filtered by contextual awareness. In these cases, context may be passed to the server and interpreted by the server to deliver a tree reshaped by the received context.

Configuration of Access and Rendering to User-Specific or Role-Specific Data

The system for rendering and interacting with hierarchical data trees may be run as a generic user or may be run according to user-specific or role-specific data. Through the examples below it may be seen that one or more of access to particular data, the rendering of specific data, the data within particular subtrees, and/or one or more graphical user interface elements are based according at least in part to the user-specific data.

For instance, hierarchy viewer and selector 204 may operate with a security context, according to a specific user's credentials (e.g., access specific to a role and/or user name). The use of security may impact the one or more node trees 216 available to the user as well as how search functions perform. Initially, a computation may be performed at login time to determine the one or more node trees 216 available to the user. For instance, at login a username is first captured and authenticated using password authentication, although other authentication such as multi-factor authentication, tokens, biometrics, or certificates may be used. Once the password or other authentication is accepted and the username is authenticated, any roles associated with the username may be applied. Then, only the one or more node trees 216 accessible to the roles of the particular user are made available for use. This allows control over one or more node trees 216 or subtrees within the one or more trees 216 that may even be seen or accessed by a particular user or role. This type of security may be implemented to prevent a lower-level user from accessing one or more trees 216 designed for high-level users or to restrict tree access behind a paywall of sorts.

Authentication information or other user-specific information may be stored in association with a user session with an application instance, for example, based on information determined from Oracle Identity®, OAuth, single sign on, or via an authentication prompt to the user. Any credentials stored in the system (e.g., in association with the user's session) may be used by a hierarchy viewer and selector to authenticate with an external service for a short term connection or long term connection allowing process 100 to be run without a credentials prompt. Credentials known by the system may also be reapplied to the external service after they become outdated.

After determining the security level of a given user, the results may be cached so the list of available trees may be reused throughout the user's session. However, despite the initial security check and caching, conditions may exist, that if met, may impact the list of available trees. For example, an employee's access may change over time or even be disabled, and access to a set of available trees and/or other data in the application session may be restricted based on the changing access of the employee.

In FIG. 3C, while "United States" is shown in a rendered tree, a company may have stores located internationally and thus a master tree may also contain entities related to stores outside the United States. However, an example reason for only "United States" being shown in the tree may be security based. For instance, the user 202 may only be in charge or a United States arm of the company any is limited by certain security parameters from seeing data from outside the United States. Alternatively, the user 202 may be a consumer excluded from doing business outside the United States and is thus only shown data limited to the United States. In one embodiment, at least one of retrieval or display in process 100 of at least one of first data, second data, or third data is limited based at least in part on one or more authentication parameter.

Agentic Request Generation and Display of Data

Retrieving and rendering data for display on a graphical user interface may be augmented using machine learning. As shown in FIG. 2, the system may provide access to machine learning resources 218. Machine learning resources 218 may include one or more models such as a large language model 220 and natural language model 222. The models used may be, for example, a large language model such as gpt-3.5-turbo or gpt-5. Other natural language models include models provided by, but not limited to, Cohere, Azure AI, Google PaLM 2, Llama 3, multi-modal providers, small language model providers, compact language model providers, neural network language processing systems, etc. The models may also be private and is not limited to currently available publicly accessible models.

Machine learning resources 218 may be trained with user 202 interaction with node tree source 214. For example, learned user 202 interaction with a navigable tree on user interface 206 may guide machine learning resources 218 to load certain entities with priority if they are commonly accessed. In one embodiment a request is generated based on learned user interaction with the navigable tree and the learned user interaction indicates one or more second entities are more likely to be retrieved with one or more first entities than one or more third entities are to be retrieved with the one or more first entities. For example, machine learning resources may detect that when a certain node is requested and a secondary node is often requested shortly thereafter. In that case, either the original request may be modified, or a secondary request may be generated, in which the secondary node is requested even when the secondary node was not included in the original request.

Alternatively or additionally, retrieval and rendering data may be accomplished through one or more artificial intelligence agents (AI agents) as AI agents may accomplish processing retrieval requests that are not feasible for human completion. One or more AI agents may be tasked with monitoring a data structure and user usage. The AI agents may be trained to perform specific tasks with regards to monitoring and generating requests such as generating a prompt to a large language model or performing tasks of interpreting data. The one or more AI agents may be specific to a certain type of information or use case. For example, an AI agent may be trained only using information relating to a particular user or role, in which case the AI agent may be specific to handling requests involving the particular user or role. An AI agent may also be specific to a certain role or task when rendering data such as which neighborhood to retrieve and render first. An AI agent may run in its own container in a cloud infrastructure and ingest requests, for example, by taking as input a natural language input from a user including a request to retrieve hierarchical data.

In one embodiment, a managing agent determines one or more types of task aspects for handling requests for data, and the managing agent assigns one or more worker agents specialized to handle each of the one or more determined task aspects. The worker agents may augment data requests with the assistance of generative artificial intelligence, one or more customized prompt templates optionally specific to the corresponding worker agent, and/or one or more customized tools optionally specific to the corresponding worker agent.

Computer System Architecture

Figure 4:
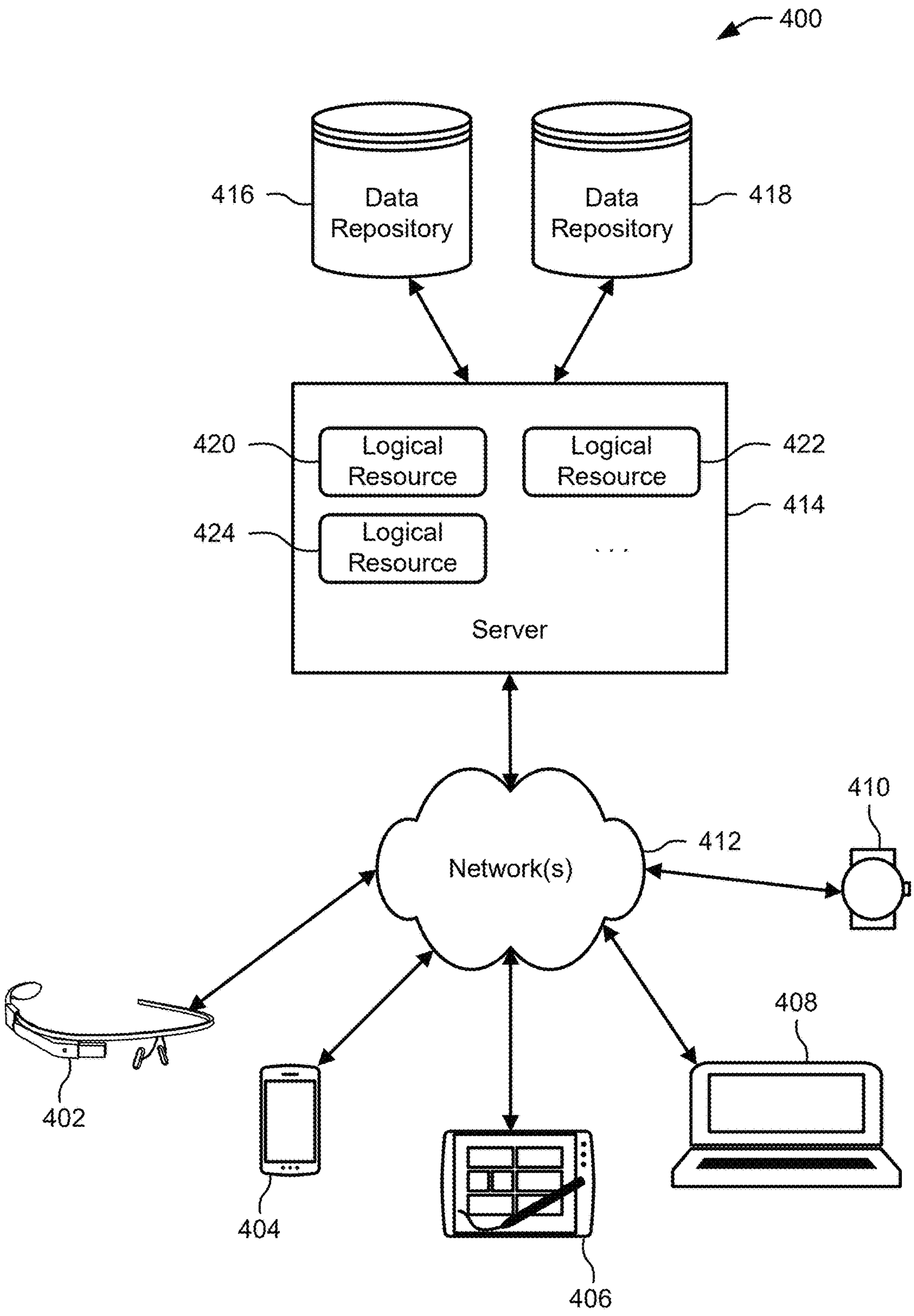
FIG. 4 depicts a simplified diagram of a distributed system for implementing certain aspects.

FIG. 4 depicts a simplified diagram of a distributed system 400 for implementing an embodiment. In the illustrated embodiment, distributed system 400 includes one or more client computing devices 402, 404, 406, 408, and/or 410 coupled to a server 414 via one or more communication networks 412. Client computing devices 402, 404, 406, 408, and/or 410 may be configured to execute one or more applications.

In various aspects, server 414 may be adapted to run one or more services or software applications that enable techniques for rendering and interacting with hierarchical data tree(s).

In certain aspects, server 414 may also provide other services or software applications that can include non-virtual and virtual environments. In some aspects, these services may be offered as web-based or cloud services, such as under a Software as a Service (SaaS) model to the users of client computing devices 402, 404, 406, 408, and/or 410. Users operating client computing devices 402, 404, 406, 408, and/or 410 may in turn utilize one or more client applications to interact with server 414 to utilize the services provided by these components.

In the configuration depicted in FIG. 4, server 414 may include one or more components 420, 422 and 424 that implement the functions performed by server 414. These components may include software components that may be executed by one or more processors, hardware components, or combinations thereof. It should be appreciated that various different system configurations are possible, which may be different from distributed system 400. The embodiment shown in FIG. 4 is thus one example of a distributed system for implementing an embodiment system and is not intended to be limiting.

Users may use client computing devices 402, 404, 406, 408, and/or 410 for techniques for rendering and interacting with hierarchical data tree(s) in accordance with the teachings of this disclosure. A client device may provide an interface that enables a user of the client device to interact with the client device. The client device may also output information to the user via this interface. Although FIG. 4 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 412 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 412 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 802.11 suite of protocols, Bluetooth®, and/or any other wireless protocol), and/or any combination of these and/or other networks.

Server 414 may be composed of one or more general purpose computers, specialized server computers (including, by way of example, PC (personal computer) servers, UNIX® servers, LINUX® servers, mid-range servers, mainframe computers, rack-mounted servers, etc.), server farms, server clusters, a Real Application Cluster (RAC), database servers, or any other appropriate arrangement and/or combination. Server 414 can include one or more virtual machines running virtual operating systems, or other computing architectures involving virtualization such as one or more flexible pools of logical storage devices that can be virtualized to maintain virtual storage devices for the server. In various aspects, server 414 may be adapted to run one or more services or software applications that provide the functionality described in the foregoing disclosure.

The computing systems in server 414 may run one or more operating systems including any of those discussed above, as well as any commercially available server operating system. Server 414 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 414 may include one or more applications to analyze and consolidate data feeds and/or event updates received from users of client computing devices 402, 404, 406, 408, and/or 410. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 414 may also include one or more applications to display the data feeds and/or real-time events via one or more display devices of client computing devices 402, 404, 406, 408, and/or 410.

Distributed system 400 may also include one or more data repositories 416, 418. These data repositories may be used to store data and other information in certain aspects. For example, one or more of the data repositories 416, 418 may be used to store information for techniques for rendering and interacting with hierarchical data tree(s). Data repositories 416, 418 may reside in a variety of locations. For example, a data repository used by server 414 may be local to server 414 or may be remote from server 414 and in communication with server 414 via a network-based or dedicated connection. Data repositories 416, 418 may be of different types. In certain aspects, a data repository used by server 414 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 416, 418 may also be used by applications to store application data. The data repositories used by applications may be of different types such as, for example, a key-value store repository, an object store repository, or a general storage repository supported by a file system.

In one embodiment, server 414 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 5:
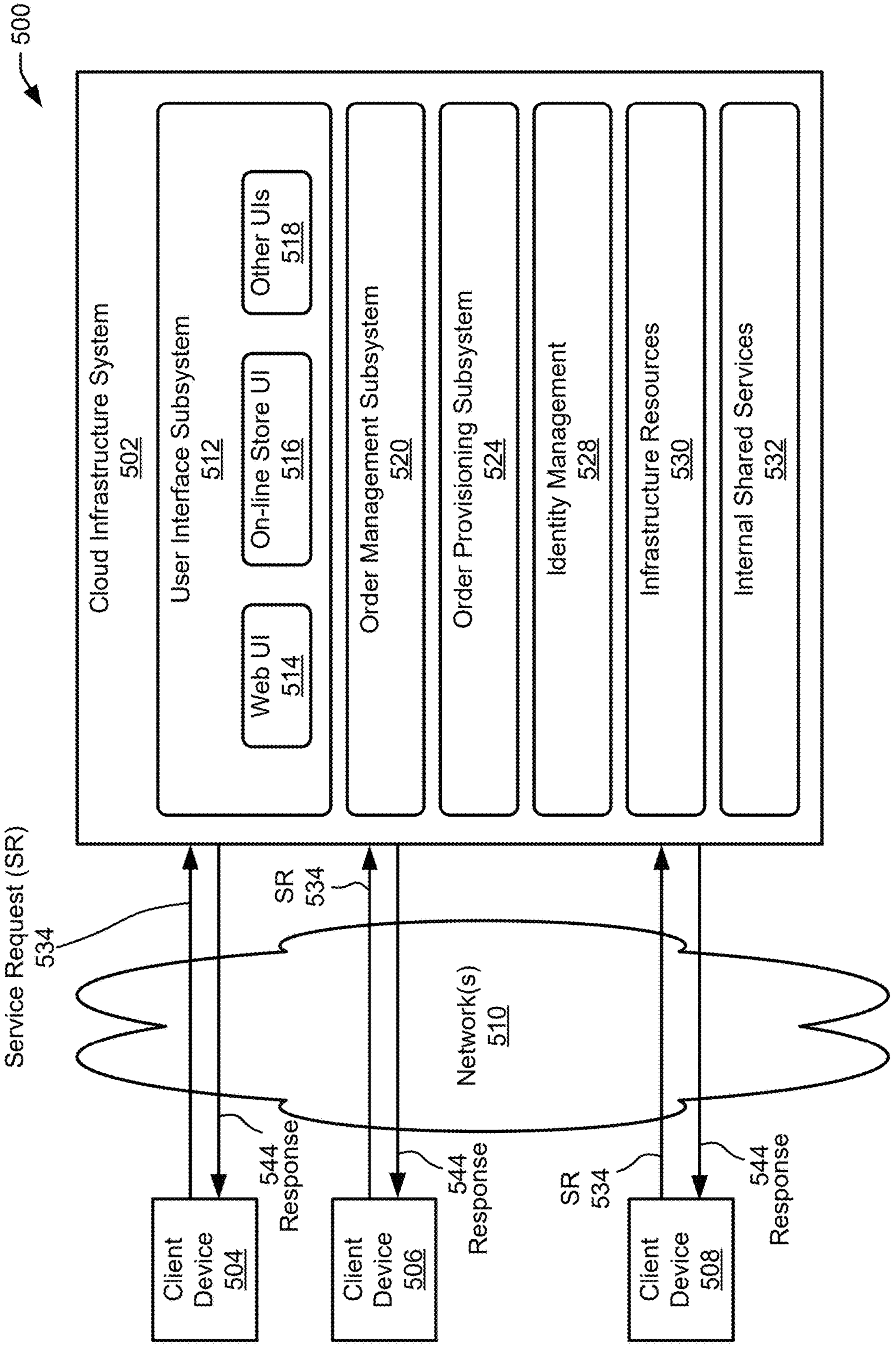
FIG. 5 is a simplified block diagram of one or more components of a system environment by which services provided by one or more components of an embodiment system may be offered as cloud services, in accordance with certain aspects.

FIG. 5 is a simplified block diagram of a cloud-based system environment in which processes for rendering and interacting with hierarchical data tree(s) may occur, in accordance with certain aspects. In the embodiment depicted in FIG. 5, cloud infrastructure system 502 may provide one or more cloud services that may be requested by users using one or more client computing devices 504, 506, and 508. Cloud infrastructure system 502 may comprise one or more computers and/or servers that may include those described above for server 414. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The embodiment depicted in FIG. 5 is only one example of a cloud infrastructure system and is not intended to be limiting. It should be appreciated that, in some other aspects, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative aspects.

The term cloud service is generally used to refer to a service that is made available to users on demand and via a communication network such as the Internet by systems (e.g., cloud infrastructure system 502) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 510 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 502 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 502 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 502. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 502. Cloud infrastructure system 502 then performs processing to provide the services requested in the tenant's subscription order. Cloud infrastructure system 502 may be configured to provide one or even multiple cloud services.

Cloud infrastructure system 502 may provide the cloud services via different deployment models. In a public cloud model, cloud infrastructure system 502 may be owned by a third party cloud services provider and the cloud services are offered to any general public tenant, where the tenant can be an individual or an enterprise. In certain other aspects, under a private cloud model, cloud infrastructure system 502 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 502 and the services provided may be shared by several organizations in a related community. Various other models such as hybrids of the above mentioned models may also be used.

Client computing devices 504, 506, and 508 may be of different types (such as devices 402, 404, 406, and 408 depicted in FIG. 4) and may be capable of operating one or more client applications. A user may use a client device to interact with cloud infrastructure system 502, such as to request a service provided by cloud infrastructure system 502.

In some aspects, the processing performed by cloud infrastructure system 502 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 502 for determining the intent of an utterance. The data used for this analysis may include structured data (e.g., data stored in a database or structured according to a structured model) and/or unstructured data (e.g., data blobs (binary large objects)).

As depicted in the embodiment in FIG. 5, cloud infrastructure system 502 may include infrastructure resources 530 that are utilized for facilitating the provision of various cloud services offered by cloud infrastructure system 502. Infrastructure resources 530 may include, for example, processing resources, storage or memory resources, networking resources, and the like.

In certain aspects, to facilitate efficient provisioning of these resources for supporting the various cloud services provided by cloud infrastructure system 502 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provisioning of services by cloud infrastructure system 502. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 502 may comprise multiple subsystems. These subsystems may be implemented in software, or hardware, or combinations thereof. As depicted in FIG. 5, the subsystems may include a user interface subsystem 512 that enables users of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a tenant may, using a client device, request (service request 534) one or more services provided by cloud infrastructure system 502 using one or more of interfaces 514, 516, and 518. For example, a tenant may access the online store, browse cloud services offered by cloud infrastructure system 502, and place a subscription order for one or more services offered by cloud infrastructure system 502 that the tenant wishes to subscribe to. The service request may include information identifying the tenant and one or more services that the tenant desires to subscribe to. For example, a tenant may place a subscription order for a chatbot related service offered by cloud infrastructure system 502. As part of the order, the client may provide information identifying the input (e.g. utterances).

In certain aspects, such as the embodiment depicted in FIG. 5, cloud infrastructure system 502 may comprise a service management subsystem (OMS) 520 that is configured to process the new order. As part of this processing, OMS 520 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 520 may then invoke the service provisioning subsystem (OPS) 524 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 524 may be configured to determine the particular cloud service being requested and identify a number of pods that may have been pre-configured for that particular cloud service. The number of pods that are allocated for an order may depend upon the size/amount/level/scope of the requested service.

For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 502 may send a response or notification 544 to the requesting tenant to indicate when the requested service is now ready for use. In some instances, information (e.g., a link) may be sent to the tenant that enables the tenant to start using and availing the benefits of the requested services.

Cloud infrastructure system 502 may provide services to multiple tenants. For each tenant, cloud infrastructure system 502 is responsible for managing information related to one or more subscription orders received from the tenant, maintaining tenant data related to the orders, and providing the requested services to the tenant or clients of the tenant. Cloud infrastructure system 502 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 502 may provide services to multiple tenants in parallel. Cloud infrastructure system 502 may store information for these tenants, including possibly proprietary information. In certain aspects, cloud infrastructure system 502 comprises an identity management subsystem (IMS) 528 that is configured to manage tenant's information and provide the separation of the managed information such that information related to one tenant is not accessible by another tenant. IMS 528 may be configured to provide various security-related services such as identity services, such as information access management, authentication and authorization services, services for managing tenant identities and roles and related capabilities, and the like.

Figure 6:
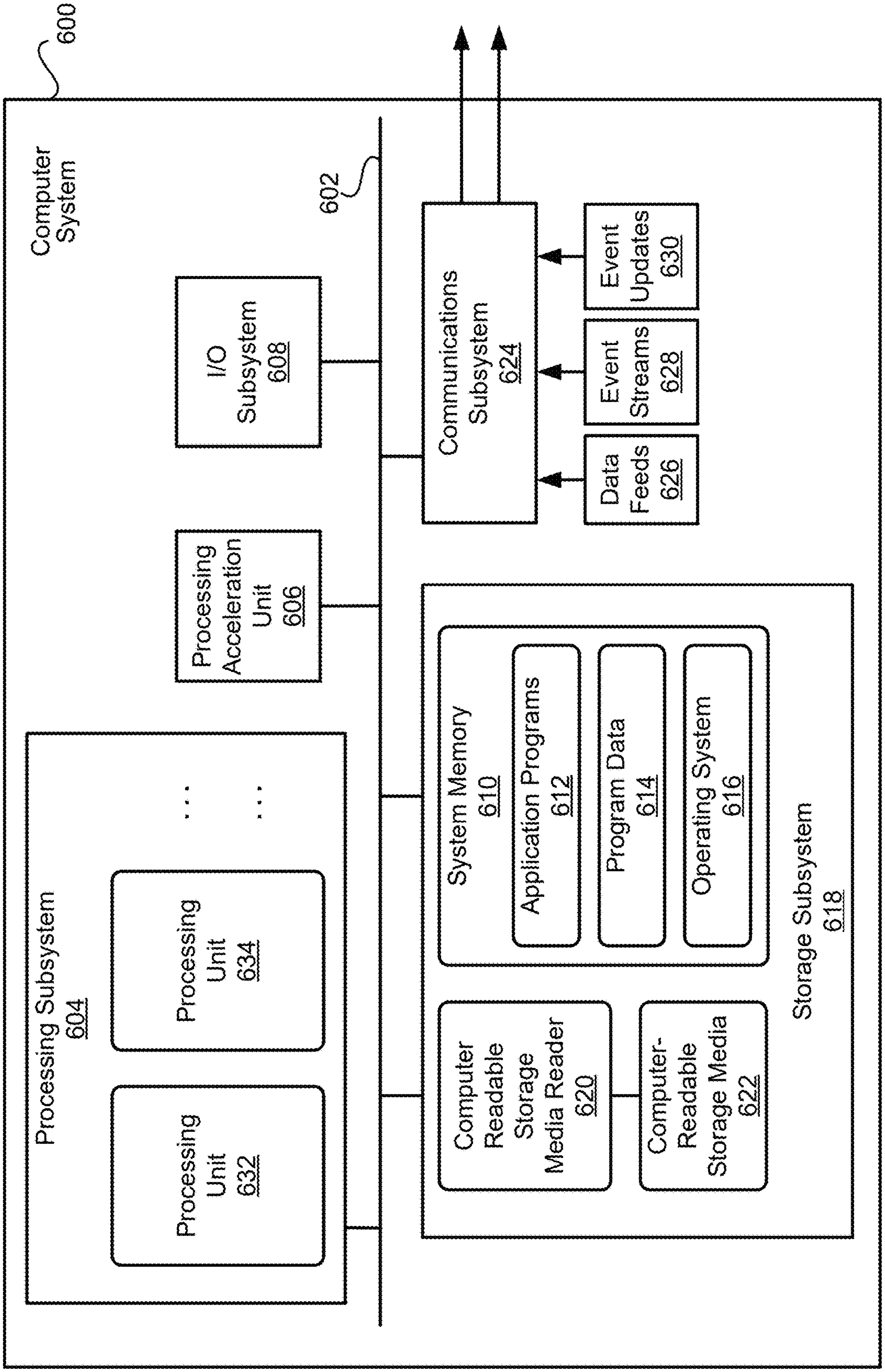
FIG. 6 illustrates an example computer system that may be used to implement certain aspects.

FIG. 6 illustrates an exemplary computer system 600 that may be used to implement certain aspects. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory and/or transitory computer-readable storage media including storage media 622 and a system memory 610.

Bus subsystem 602 provides a mechanism for letting the various components and subsystems of computer system 600 communicate with each other as intended. Although bus subsystem 602 is shown schematically as a single bus, alternative aspects of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 604 controls the operation of computer system 600 and may comprise one or more processors, application specific integrated circuits (ASICs), or field programmable gate arrays (FPGAs). The processors may be single core or multicore processors. The processing resources of computer system 600 can be organized into one or more processing units 632, 634, etc. A processing unit may include one or more processors, one or more cores from the same or different processors, a combination of cores and processors, or other combinations of cores and processors. In some aspects, processing subsystem 604 can include one or more special purpose co-processors such as graphics processors, digital signal processors (DSPs), or the like. In some aspects, some or all of the processing units of processing subsystem 604 can be implemented using customized circuits, such as application specific integrated circuits (ASICs), or field programmable gate arrays (FPGAs).

In some aspects, the processing units in processing subsystem 604 can execute instructions stored in system memory 610 or on computer readable storage media 622. In various aspects, the processing units can execute a variety of programs or code instructions and can maintain multiple concurrently executing programs or processes. At any given time, some or all of the program code to be executed can be resident in system memory 610 and/or on computer-readable storage media 622 including potentially on one or more storage devices. Through suitable programming, processing subsystem 604 can provide various functionalities described above. In instances where computer system 600 is executing one or more virtual machines, one or more processing units may be allocated to each virtual machine.

In certain aspects, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some aspects. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide a repository for storing data used in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 622 may store programming and data constructs that provide the functionality of some aspects. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, digital video disc (DVD), a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 618 may also include a computer-readable storage media reader 620 that can further be connected to computer-readable storage media 622. Reader 620 may receive and be configured to read data from a memory device such as a disk, a flash drive, etc.

In certain aspects, computer system 600 may support virtualization technologies, including but not limited to virtualization of processing and memory resources. For example, computer system 600 may provide support for executing one or more virtual machines. In certain aspects, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices. For example, the communications subsystem may be used to transmit a response to a user regarding the inquiry for a chatbot.

Communications subsystem 624 may support both wired and/or wireless communication protocols. For example, in certain aspects, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802 family of standards, or other mobile communication technologies, or any combination thereof), global positioning system (GPS) receiver components, and/or other components. In some aspects, communications subsystem 624 can provide wired network connectivity (e.g., Ethernet) in addition to or instead of a wireless interface.

Communications subsystem 624 can receive and transmit data in various forms. For example, in some aspects, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 624 may be configured to receive data in the form of continuous data streams, which may include event streams 628 of real-time events and/or event updates 630, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

storing, in a cache, a valid version of first data associated with a first identifier of one or more first entities of one or more node trees without storing, in the cache, a valid version of second data associated with a second identifier of one or more second entities of the one or more node trees, and without storing, in the cache, a valid version of third data associated with a third identifier of one or more third entities of the one or more node trees; wherein the valid version of first data is stored, in the cache, in response to a first retrieval of the valid version of the first data from a node tree source;

accessing a request for a plurality of entities for display on a navigable tree, the plurality of entities comprising the one or more first entities identified by the first identifier and the one or more second entities identified by the second identifier; wherein the plurality of entities does not include the one or more third entities;

in response to the request, determining, based at least in part on the first identifier and the second identifier, that the valid version of first data is in the cache and that the valid version of second data is not in the cache;

in response to the determining, accessing the cache to retrieve the valid version of first data and accessing the node tree source to retrieve the valid version of second data without retrieving at least part of the valid version of third data;

causing display of a graphical user interface showing data for at least part of the plurality of entities; wherein the graphical user interface comprises the navigable tree that allows navigation to the one or more first entities and the one or more second entities; wherein data for at least one of the one or more first entities is displayed on the navigable tree in parallel while data for at least one of the one or more second entities is retrieved from the node tree source; wherein the data for the at least one of the one or more second entities is added to the navigable tree after receiving a response from the node tree source;

determining that the one or more third entities are accessible from the navigable tree even though the one or more third entities were not among the plurality of entities of the request, and, in response to the determining that the one or more third entities are accessible from the navigable tree and that the cache does not store the valid version of third data, retrieving the valid version of third data from the node tree source absent a separate request to view data for the one or more third entities.

2. The computer-implemented method of claim 1, wherein the first retrieval of the valid version of first data from the node tree source is performed in response to determining that the cache stores an invalid version of first data based at least in part on determining a change associated with the first identifier without receiving a new request to view the one or more first entities on the graphical user interface since the invalid version of first data was retrieved.

3. The computer-implemented method of claim 1, further comprising: receiving another request to display data for at least one of the one or more third entities; determining a status of an incomplete retrieval of the valid version of third data from the node tree source; and, based at least in part on the status, awaiting completion of the incomplete retrieval of the valid version of third data from the node tree source without initiating a separate retrieval of the valid version of third data from the node tree source.

4. The computer-implemented method of claim 1, further comprising: receiving another request to display data for at least one of the one or more third entities; determining a status of an incomplete retrieval of the valid version of third data from the node tree source; and, based at least in part on the status, requesting the valid version of third data from the node tree source in a separate request in parallel with a prior request for the valid version of third data from the node tree source.

5. The computer-implemented method of claim 1, further comprising: receiving another request to display data for at least one of the one or more third entities; requesting the valid version of third data from the node tree source in a separate request in parallel with a prior request for the valid version of third data from the node tree source; and canceling the separate request for the valid version of third data from the node tree source on determining that the prior request is completed.

6. The computer-implemented method of claim 1, further comprising: receiving another request to display data for at least one of the one or more third entities; requesting the valid version of third data from the node tree source in a separate request in parallel with a prior request for the valid version of third data from the node tree source; and canceling the prior request for the valid version of third data from the node tree source on determining that the separate request is completed.

7. The computer-implemented method of claim 1, wherein the cache is a cache of a browser and the node tree source is a server remote to the browser; and wherein data for the one or more node trees is delivered from the node tree source to the browser via size-limited packets that are smaller in size than the first data, smaller in size than the second data, and smaller in size than the third data.

8. The computer-implemented method of claim 1, wherein the cache is a cache of a browser with storage limitations that prevent storage of the one or more node trees in their entirety.

9. The computer-implemented method of claim 1, wherein the cache is a cache of a browser with storage limitations specific to different URLs; wherein at least the valid version of third data from the node tree source is retrieved from a separate URL than at least the valid version of first data from the node tree source.

10. The computer-implemented method of claim 1, wherein receiving a response from the node tree source includes receiving the valid version of second data as streaming JSON.

11. The computer-implemented method of claim 1, wherein the response from the node tree source utilizes at least one of text compression, binary encodings, or schema-based compression techniques.

12. The computer-implemented method of claim 1, wherein the request is generated based on learned user interaction with the navigable tree, and wherein the learned user interaction indicates the one or more second entities are more likely to be retrieved with the one or more first entities than the one or more third entities are to be retrieved with the one or more first entities.

13. The computer-implemented method of claim 1, wherein at least one of retrieval or display of at least one of the first data, the second data, or the third data is altered based at least in part on one or more authentication parameter.

14. The computer-implemented method of claim 1, wherein the request is generated based at least in part on a location of entities within the navigable tree, and wherein the one or more second entities share a neighborhood with the one or more first entities.

15. A computer-program product comprising one or more non-transitory machine-readable storage media, including stored instructions configured to cause a computing system to perform a set of actions including:

storing, in a cache, a valid version of first data associated with a first identifier of one or more first entities of one or more node trees without storing, in the cache, a valid version of second data associated with a second identifier of one or more second entities of the one or more node trees, and without storing, in the cache, a valid version of third data associated with a third identifier of one or more third entities of the one or more node trees; wherein the valid version of first data is stored, in the cache, in response to a first retrieval of the valid version of the first data from a node tree source;

accessing a request for a plurality of entities for display on a navigable tree, the plurality of entities comprising the one or more first entities identified by the first identifier and the one or more second entities identified by the second identifier; wherein the plurality of entities does not include the one or more third entities;

in response to the request, determining, based at least in part on the first identifier and the second identifier, that the valid version of first data is in the cache and that the valid version of second data is not in the cache;

in response to the determining, accessing the cache to retrieve the valid version of first data and accessing the node tree source to retrieve the valid version of second data without retrieving at least part of the valid version of third data;

causing display of a graphical user interface showing data for at least part of the plurality of entities; wherein the graphical user interface comprises the navigable tree that allows navigation to the one or more first entities and the one or more second entities; wherein data for at least one of the one or more first entities is displayed on the navigable tree in parallel while data for at least one of the one or more second entities is retrieved from the node tree source; wherein the data for the at least one of the one or more second entities is added to the navigable tree after receiving a response from the node tree source;

determining that the one or more third entities are accessible from the navigable tree even though the one or more third entities were not among the plurality of entities of the request, and, in response to the determining that the one or more third entities are accessible from the navigable tree and that the cache does not store the valid version of third data, retrieving the valid version of third data from the node tree source absent a separate request to view data for the one or more third entities.

16. The computer-program product of claim 15, wherein the set of actions further includes: the first retrieval of the valid version of the first data from the node tree source is performed in response to determining that the cache stores an invalid version of the first data based at least in part on determining a change associated with the first identifier without receiving a new request to view the one or more first entities on the graphical user interface since the invalid version of the first data was retrieved.

17. The computer-program product of claim 15, wherein the set of actions further includes: receiving another request to display data for at least one of the one or more third entities; requesting the valid version of third data from the node tree source in a separate request in parallel with a prior request for the valid version of third data from the node tree source; and canceling the separate request for the valid version of third data from the node tree source on determining that the prior request is completed.

18. A system comprising:

one or more processors;

one or more non-transitory computer-readable media storing instructions, which, when executed by the system, cause the system to perform a set of actions including:

storing, in a cache, a valid version of first data associated with a first identifier of one or more first entities of one or more node trees without storing, in the cache, a valid version of second data associated with a second identifier of one or more second entities of the one or more node trees, and without storing, in the cache, a valid version of third data associated with a third identifier of one or more third entities of the one or more node trees; wherein the valid version of first data is stored, in the cache, in response to a first retrieval of the valid version of the first data from a node tree source;

accessing a request for a plurality of entities for display on a navigable tree, the plurality of entities comprising the one or more first entities identified by the first identifier and the one or more second entities identified by the second identifier; wherein the plurality of entities does not include the one or more third entities;

in response to the request, determining, based at least in part on the first identifier and the second identifier, that the valid version of first data is in the cache and that the valid version of second data is not in the cache;

in response to the determining, accessing the cache to retrieve the valid version of first data and accessing the node tree source to retrieve the valid version of second data without retrieving at least part of the valid version of third data;

causing display of a graphical user interface showing data for at least part of the plurality of entities; wherein the graphical user interface comprises the navigable tree that allows navigation to the one or more first entities and the one or more second entities; wherein data for at least one of the one or more first entities is displayed on the navigable tree in parallel while data for at least one of the one or more second entities is retrieved from the node tree source; wherein the data for the at least one of the one or more second entities is added to the navigable tree after receiving a response from the node tree source;

determining that the one or more third entities are accessible from the navigable tree even though the one or more third entities were not among the plurality of entities of the request, and, in response to the determining that the one or more third entities are accessible from the navigable tree and that the cache does not store the valid version of third data, retrieving the valid version of third data from the node tree source absent a separate request to view data for the one or more third entities.

19. The system of claim 18, wherein the set of actions further includes: the first retrieval of the valid version of the first data from the node tree source is performed in response to determining that the cache stores an invalid version of the first data based at least in part on determining a change associated with the first identifier without receiving a new request to view the one or more first entities on the graphical user interface since the invalid version of the first data was retrieved.

20. The system of claim 18, wherein the set of actions further includes: receiving another request to display data for at least one of the one or more third entities; requesting the valid version of third data from the node tree source in a separate request in parallel with a prior request for the valid version of third data from the node tree source; and canceling the separate request for the valid version of third data from the node tree source on determining that the prior request is completed.

* * * * *